March 26, 1929.  A. M. KROCZEK  1,706,853
BIRD CAGE MAKING MACHINE
Filed Aug. 10, 1927     4 Sheets-Sheet 1

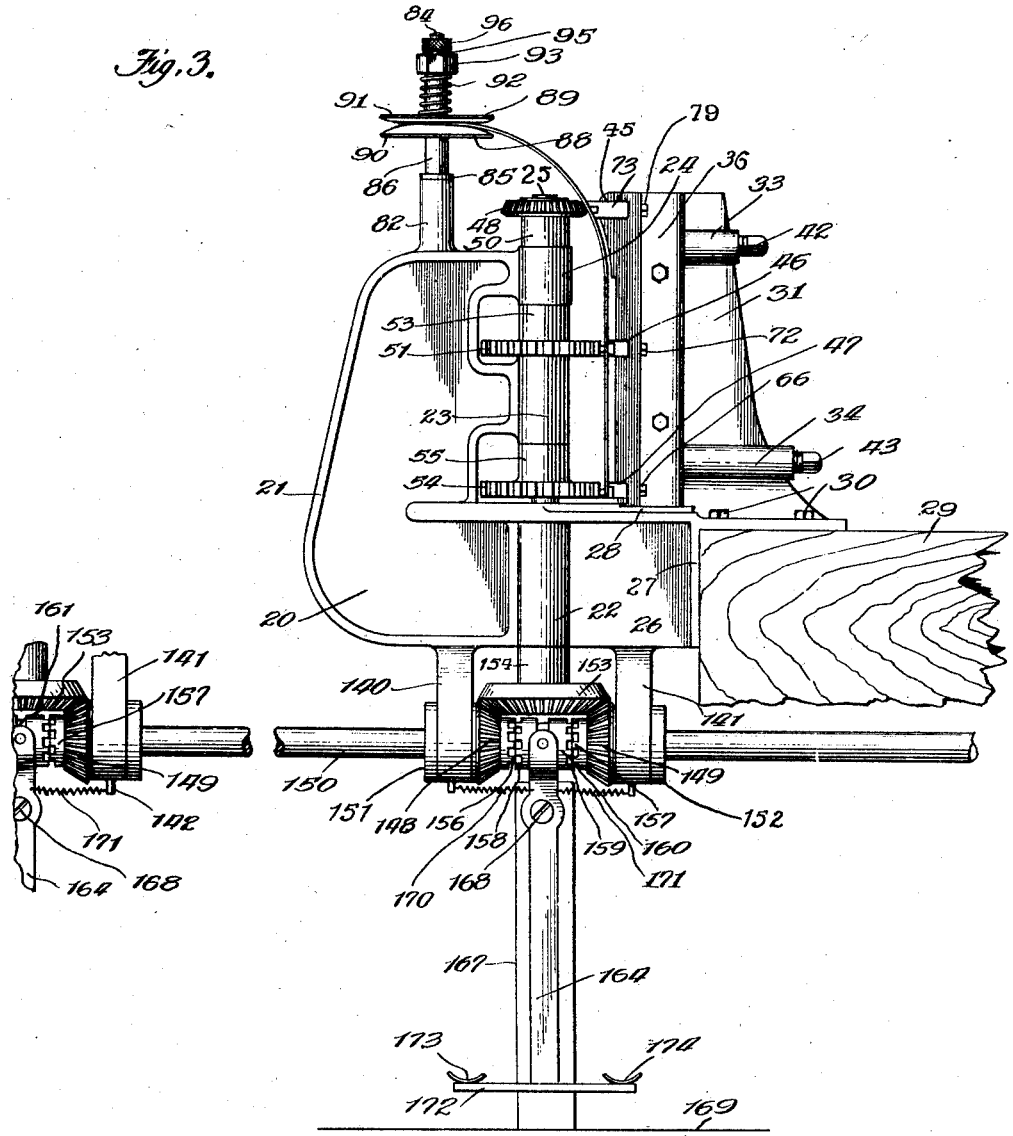

March 26, 1929.  A. M. KROCZEK  1,706,853
BIRD CAGE MAKING MACHINE
Filed Aug. 10, 1927    4 Sheets-Sheet 4
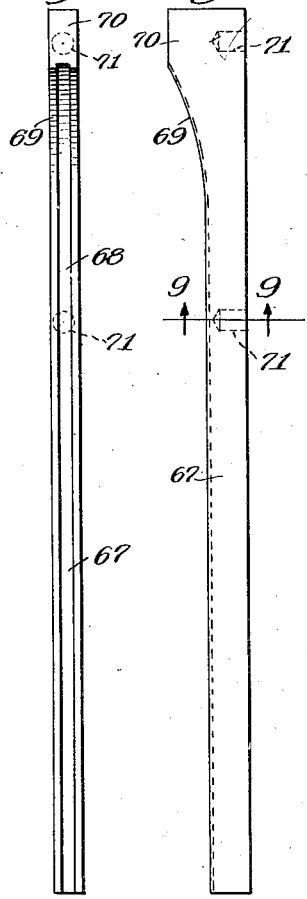
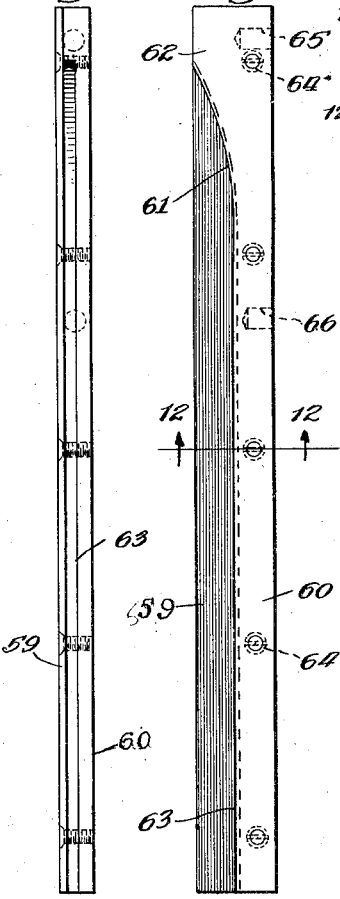
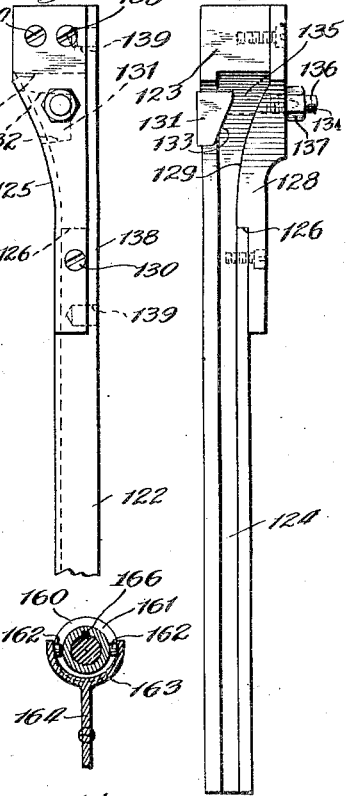
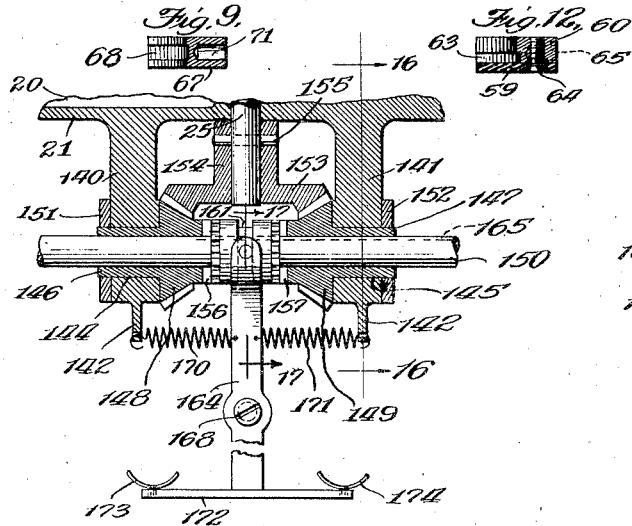
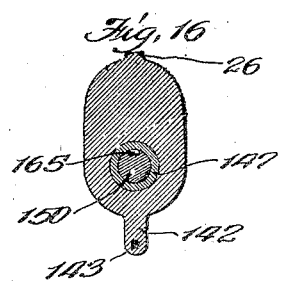
Inventor
A. M. Kroczek
By B. Pelechowicz
Atty.

Patented Mar. 26, 1929.

1,706,853

UNITED STATES PATENT OFFICE.

ANTON M. KROCZEK, OF CHICAGO, ILLINOIS.

BIRD-CAGE-MAKING MACHINE.

Application filed August 10, 1927. Serial No. 212,003.

The present invention relates to bird cage making machine and its principal object is the provision of a machine which is capable of forming bird cages out of metallic bands and strands or wires.

In a bird cage of the construction where wire strands forming the dome are encompassed and held in position by annular bands through which the wires are passed, and then the eyes are compressed by suitable tool in order to frictionally hold therein the wires and prevent their displacement from the band, sometimes soldering metal is dropped into the eye in order to firmly hold the wire in the band. A further object of the present invention is the provision of a bird cage making machine which would compress said eyes for clamping the same and preventing their displacement.

Another object of the present invention is the provision of rotatable elements in a bird cage making machine which would take in the bands in a bird cage and bend the same in a curved line to conform to the outlines of a bird cage and at the same time clamp the wires of the bird cage to the annular bands.

With the above general objects in view and others that will appear as the nature of the invention is better understood, the same consists in the novel construction, combination and arrangement of parts hereinafter more fully described, illustrated in the accompanying drawings and pointed out in the appended claims.

In the drawings forming a part of this application, and in which like designating characters refer to corresponding parts throughout the several views.

Fig. 3 is a side elevational view of the present invention together with a plurality of means for simultaneneously driving or operating a plurality of the bird cage making machines.

Fig. 4 is a fragmentary enlarged view of a section of Fig. 1 showing in cross-section a guiding bar and a rotary compression gear with an annular band disposed therebetween with a wire in the eye formed in said annular band while said eye is in the process of being clamped;

Fig. 5 is a cross-sectional view on a horizontal plane, on line 5—5 of Fig. 4;

Fig. 6 is a top elevational view of a band with eyelets made therein, with wires positioned in said eyes, illustrating the band preparatory to its being positioned into the machine;

Fig. 7 is a side elevational view of the lowermost guiding bar in the machine for guiding the lowermost band in a bird cage during the construction thereof;

Fig. 8 is a top elevational view of said guiding bar;

Fig. 9 is a cross-sectional view through the bar, the view having been taken on line 9—9 of Fig. 8;

Fig. 10 is a side elevational view of the central guiding bar in the machine;

Fig. 11 is a top elevational view of said last guiding bar;

Fig. 12 is a cross-sectional view of said central bar, the view being taken on line 12—12 of Fig. 11;

Fig. 13 is a top elevational view of a modified form of the uppermost guiding bar with one end broken away;

Fig. 14 is a side elevational view of a modified form of said last mentioned guiding bar;

Fig. 15 is a cross-sectional view longitudinally of driving shaft, of the driving mechanism for the machine;

Fig. 16 is a cross-sectional view on line 16—16 of Fig. 15; and

Fig. 17 is a cross-sectional view on line 17—17 of Fig. 15.

Figure 1:
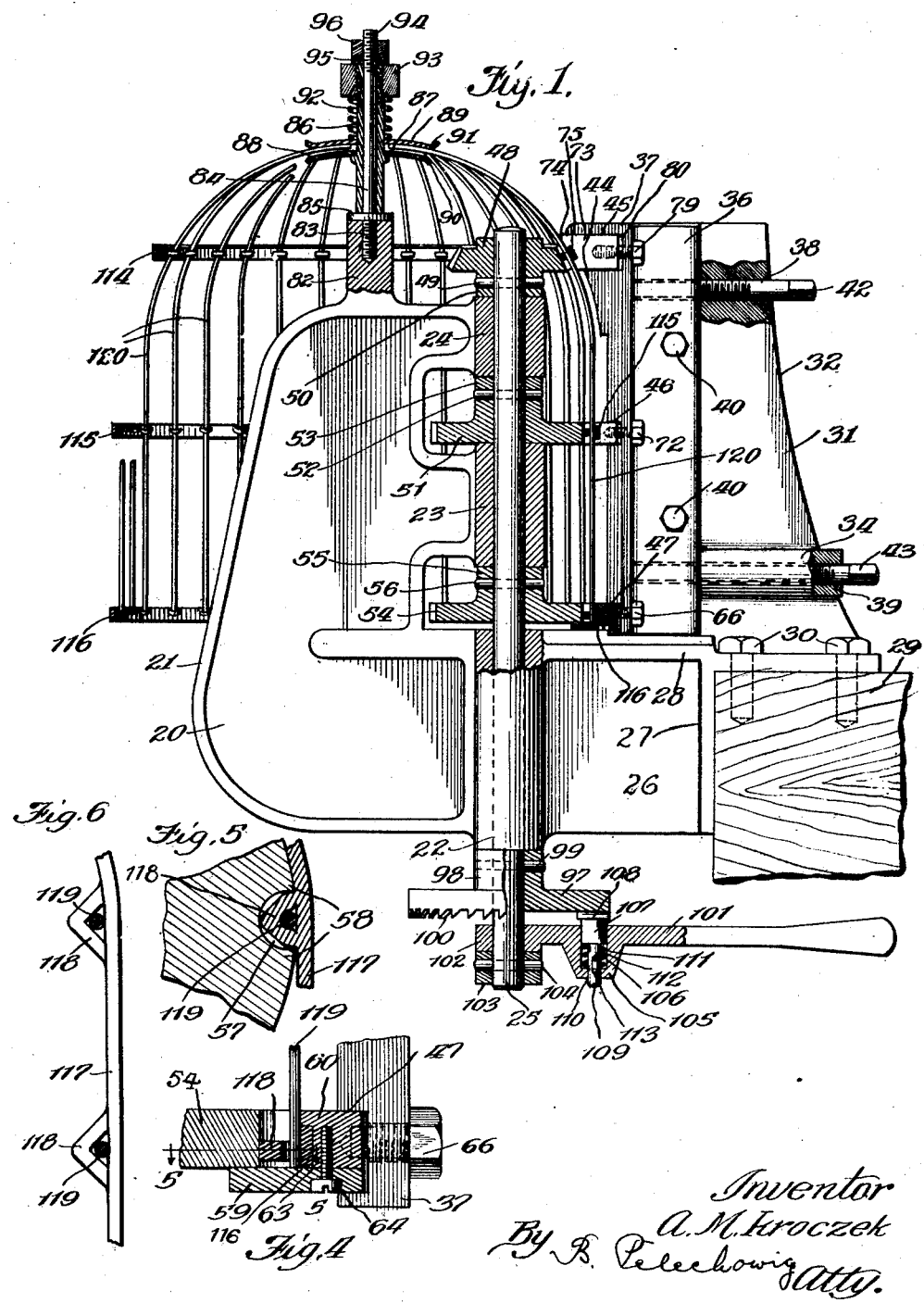
Fig. 1 is a side view, partly in section and partly in elevation, of the bird cage making machine with a bird cage in the process of construction, the view having been taken substantially on line 1—1 of Fig. 2.

Referring to the drawings in detail the machine includes frame 20, which, at its edge has a rib or flange 21 for strengthening or reinforcing said frame. Integrally formed with said frame 20 and flange 21 are three bearings 22, 23 and 24 within which upright shaft 25 is positioned and wherein said shaft is adapted for rotation. Integrally formed with the lowermost bearing 22 and projecting therefrom oppositely from said frame 20 is a plate 26 which at its opposite end terminates into plate 27 which is transversely disposed relative to said plate 26 and parallel with bearing 22. Integrally formed with said plates 26 and 27 and likewise projecting from said lowermost bearing 22 is a horizontal supporting plate 28, which in conjunction with plate 27 forms a corner for receiving therewithin corner of bench or other like support 29 upon which the entire machine is supported and held thereupon by means of bolts or screws 30 passing through the corners of plate 28. Integrally formed with and upwardly projecting from said plate 28 is a block 31, which remains on the plane with said frame 20. Said block 31 has a tapered outer end wall as at 32 and is provided with bulges 33 and 34 which terminate substantially on a line with plate 27. The inner end of block 31 extends substantially half-way between plate 27 and bearing 22, and is receivable between two lugs or walls 35 and 36 projecting from carriage 37. Said block 31 has bores 38 and 39 made in the entire length of said block and located in the bulges 33 and 34, respectively.

Said carriage 37 corresponds in width to the width of plate 28 as clearly shown on Fig. 2 and is supported by said plate 28 upon which it is adapted for shifting movement to or away from shaft 25, for the purposes hereinafter specified.

As already mentioned the inner end of block 31 is receivable between lugs or walls 35 and 36 of carriage 37 and for rigidly holding said carriage in adjusted position with said block 31 bolts 40 are provided. Said bolts 40 pass through apertures in walls 35 and 36 and also through inner end of block 31, said inner end of block 31 having oval bores 41 for receiving said bolts 40. The bores in wall 35 are threaded and likewise the ends of bolts 40 are threaded for the purpose of clamping said inner end of block 31 within said walls 35 and 36 and holding carriage 37 in rigid stationary adjusted relation with block 31.

Bores 38 and 39 at their inner ends are threaded for receiving threaded ends of screws 42 and 43. The threaded ends of said screws 42 and 43 are adapted to bear against the inner wall of carriage 37 at a point intermediate between projecting walls 35 and 36, for the purpose of shifting said carriage 37 toward shaft 25, for the purpose hereinafter specified. So that bolts 40 may not interfere with said shifting of carriage 37 by the action of screws 42 and 43 when the same are rotated, bores 41 in the inner end of block 31, through which said bolts 40 pass, are made oval, as clearly indicated on Fig. 2.

The inner face of said carriage 37 is straight, excepting the upper end thereof which is enlarged and curved as at 44 where it conforms to the general outline of the bird cage at that point, as clearly seen on Fig. 1.

Said carriage 37 is provided with transverse grooves 45, 46 and 47 for receiving therewithin respective guiding bars illustrated on Figs. 7 to 14, both inclusive, and the construction of which will be later explained in the course of this description.

The hereinabove mentioned shaft 25 is adapted to receive at its upper end gear 48 which is keyed to the shaft by pin 49 passing through collar 50 integrally formed with said gear 48 and downwardly depending therefrom. Said collar is adapted to sit upon bearing 24 formed with the frame 20.

The central gear 51 rests upon bearing 23 and is likewise keyed to shaft 25 by means of pin 52 passing through collar 53 integrally formed with said gear 51 and upwardly projecting therefrom. The lowermost gear 54 is disposed above bearing 22 and portion of the frame 20. Said last named gear 54 has an upwardly projecting collar 55 integrally formed with the gear, through which collar pin 56 passes and whereby said gear is rigidly keyed to the said shaft 25 and is adapted for rotation therewith. Said gears 48, 51 and 54 by their peripheries are oppositely disposed to grooves 45, 46 and 47, respectively, in the carriage 37 for the purposes hereinafter described.

Said gear 48 is tapered or beveled as clearly indicated on Figs. 1 and 2 and conforms to the general outline of the bird cage as it passes said gear, which will be later apparent.

Figure 2:
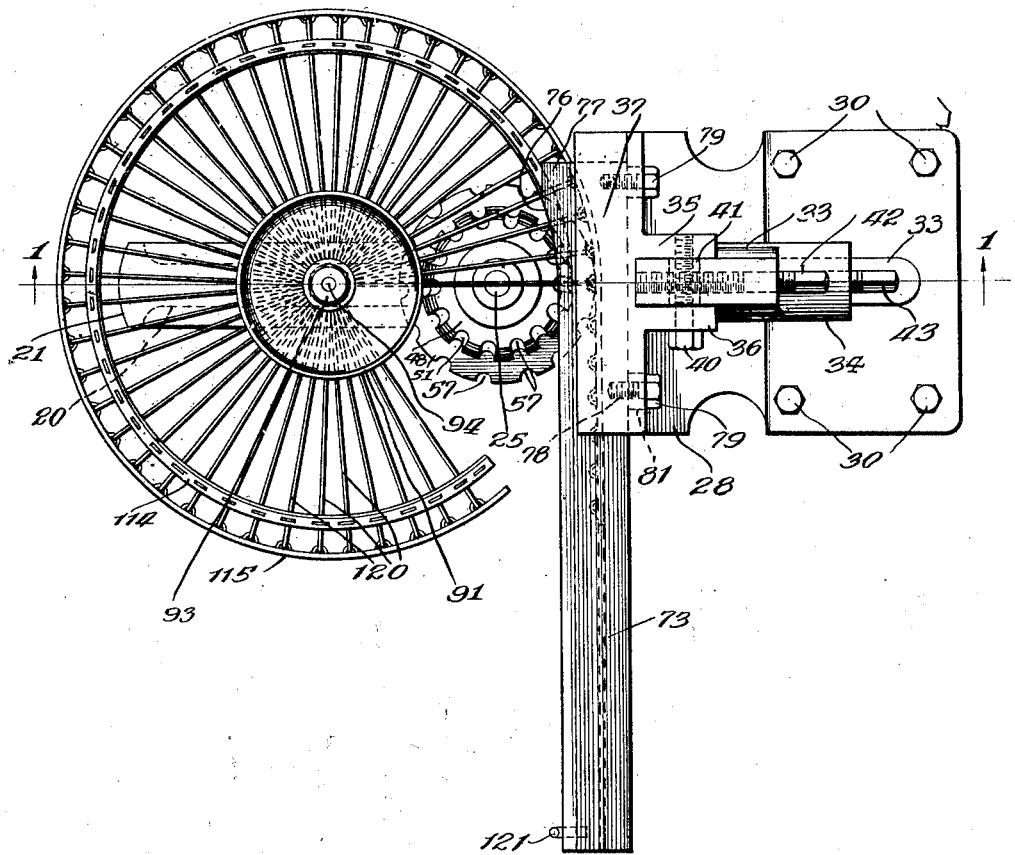
Fig. 2 is a top plan view of the present machine with a bird cage almost completed.

Each of said gears is provided with semi-annular grooves or notches 57 as clearly seen on Figs. 2 and 5, grooves 57 of the uppermost gear 48 being at an incline to conform to the beveled face of the gear as is apparent from Figs. 1 and 2. The several grooves 57 on each of said gears in cooperation with the periphery of each gear affect substantially right-angled corners 58 for the purpose hereinafter specified.

The lowermost guiding bar sitting within the longitudinal slot 47 in the carriage 37 is illustrated in detail on Figs. 10 to 12, both inclusive, and embodies a horizontal plate 59 which is comparatively thin and of equal width throughout its length. The guiding bar further includes strip 60, which is substantially one-half of the width of said plate 59, but at one of its ends said strip 60 gradually flares out affecting a tapered or curved edge 61 and terminates in a solid block or head 62 corresponding in width with the width of plate 59. Longitudinally of said strip 60 on its inner edge and adjacent plate 59, groove 63 is made in said strip 60 for the purpose which will be later apparent. Said plate 59 and strip 60 are joined together by means of screws 64 which hold the two in rigid relative condition. Said strip 60 at its outer or straight edge is provided with two plain holes 65 in which lowermost screws 66 are adapted for positioning and bearing against said strip. Said screws 66, illustrated on Figs. 1 and 3 and indirectly on Fig. 2, pass through threaded apertures made in the wall of the carriage 37 between the outer face thereof and slot or groove 47. Said screws 66 are for the purpose of regulating the bar within groove 47 for shifting the same out of said groove, or in other words for bringing the guiding bar towards gear 54, whereby finer adjustment of the relative position of the guiding bar with respect to gear 54 may be had.

The central guiding bar illustrated on Figs. 7 to 9, both inclusive, embodies a homogeneous strip 67 which in general construction substantially corresponds to the strip 60, with this difference, however, that said first named strip 67 has groove 68 made upon the inner face of the strip and centrally thereof. Said inner face of strip 67 flares out affecting curve 69 and terminates in head 70. On its outer edge the strip 67 is provided with a pair of holes 71 for receiving the ends of screws 72 which are in threaded engagement with the wall of carriage 37 at a point between the outer face of said carriage and the upright wall of groove 46. These screws 72 are likewise for the purpose of bringing about a finer adjustment of the guiding bar 67 with respect to its cooperating gear 51.

The uppermost guiding bar best shown on Figs. 1, 2 and 3 includes a longitudinal strip 73 which in its general outlines corresponds to the construction of the central guiding bar 67. However, said strip 73 is somewhat wider since at that point the wall of the carriage 37 is wider. Also the face adjacent its cooperating gear 48 is tapered as at 74 and is in substantially parallel relation with the tapered periphery of said gear 48. Said uppermost guiding bar 73 has a longitudinal groove 75 at its tapering face. The outer edge of said guiding bar 73 gradually flares out and affects a curve 76, and said guiding bar further terminates in head 77. For adjusting said guiding bar 73 in respect to the carriage 37 and to its cooperating gear 48, the said guiding bar is provided with a pair of holes 78 for receiving therewithin the ends of screws 79 which pass through the threaded bores 80 made in the carriage wall, which bores are in alinement with holes 78 in the guiding bar 73 and made at a point between the outer wall of carriage 37 and the upright wall resulting in the groove 45.

It will be seen from the foregoing description that the several guiding bars are adjustable by their respective screws for the purpose of shifting said guiding bars in their grooves in said carriage 37 toward their cooperating gears 48, 51 and 54. By screwing the respective screws as far as they will go, until the heads of said screws come in contact with the outer wall of carriage 37, the ends of said screws in holes 65, 71 and 78 will bear against the respective guiding bars and will bring the same slightly out of the respective grooves or slots 47, 46 and 45, as shown on Fig. 1. On loosening the said screws the contact of the ends thereof with the respective guiding bars will be eliminated and the operation or pressure of the gears 48, 51 and 54 will force the respective bars into grooves 45, 46 and 47.

The means for adjusting the several guiding bars in respect of their cooperating gears as hereinabove described is only for the purpose of illustration as I do not wish to be limited to that specific means. Another mode of adjusting the guiding bars within their respective grooves for bringing the same to or away from the cooperating gears is illustrated on Fig. 2 where the holes 78 in the guiding bar 73 are threaded for receiving the ends of screws 79. The holes in the wall of carriage 37 through which the screws pass may be oblong longitudinally of the guiding bar such as holes 81, and this construction will afford allowing longitudinal adjustment of the guiding bars relative of the respective grooves within which the several guiding bars are positioned.

From the construction hereinabove described it will be seen that through the medium of screws 42 and 43 which bear against the carriage 37, the carriage 37 together with the several guiding bars therewithin may be bodily moved to or away from the several gears. The screws 66, 72 and 79 cooperating with the respective guiding bars are only for the purpose of finer adjustment of said guiding bars in respect of their cooperating gears as already mentioned.

The modified form of the uppermost guiding bar illustrated on Figs. 13 and 14 will be later described when the operation of the present machine is better explained and understood as the description proceeds.

The present invention further embodies a lug 82 rigidly formed with and upwardly projecting from frame 20 or more specifically from flange 21. Axially of said lug 82 a threaded bore 83 is made for receiving therewithin the lower threaded end of spindle 84. Said spindle 84 carries rigidly formed therewith washer or flange 85, which, when the threaded lower end of spindle 84 is entirely within threaded bore 84 rests upon the end of said lug 82 and provides a limiting means for further progress of the spindle within bore 83 and at the same time prevents any lateral movement of said spindle 84 in respect of lug 82. Freely positioned upon spindle 84 is a tubular member 86, which is adapted to rest upon the upper face of flange 85. Substantially at its central portion said tubular member 86 is provided with an integrally formed annular shoulder 87 for the purpose of providing a seat thereupon for round plate 88 which is of spherical formation. Another round plate 89 of substantially like construction is positioned upon said tubular member 86 over and upon said first named plate 88. The edges of plates 88 and 89 are flared out into opposite directions to affect flanges 90 and 91, respectively. Said plates 88 and 89 have central openings through which the tubular member 86 passes. Interposed between the upper plate 89 and nut 93 which is in threaded engagement with the upper end of tubular member 86 is coil spring 92. By tightening or screwing down said nut 93 the spring 92 is compressed and more firmly bears against upper plate 89 for the purposes hereinafter described. The upper end of spindle 84 projects above the upper end of said tubular member 86 and is threaded as at 94 for receiving a washer 95 and nut 96, by means of which latter nut tubular member 86 is held in rigid position upon spindle 84.

The means for rotation of shaft 25 and gears 48, 51 and 54 includes ratchet wheel 97 having a collar 98 integrally formed with and upwardly projecting therefrom. Pin 99 passing through said collar 98 and said shaft 25 keys said ratchet wheel 97 to the shaft. Ratchet teeth 100 are downwardly depending from the ratchet wheel 97. Reciprocating lever 101 is mounted by its head 102 upon shaft 25. Said head 102 freely moves upon the shaft. For supporting said lever upon shaft 25 collar 103 is provided upon the lower end of shaft 25 and below head 102, and pin 104 keys said collar 103 to the shaft. At a point directly below ratchet teeth 100 the reciprocating lever 101 has a downwardly projecting enlargement 105 in which a comparatively wide bore 106 is made for receiving therewithin shank 107 of ratchet pawl 108 which is adapted to engage the ratchet teeth upon the ratchet wheel 97, as clearly seen on Fig. 1. Said shank 107 has a downwardly projecting rod 109 which passes through an aperture 110 made in the bottom of the enlargement 105 and communicating with the bore 106. Interposed between the bottom of bore 106 and the bottom edge of shank 107 is a coil spring 111 which urges said shank 107 and ratchet pawl 108 toward teeth 100. Rod 109 has an oblong longitudinal slot 112 made therein through which pin 113 passes. The ends of said pin are mounted in the bottom wall of the enlargement 105.

From the construction of said operating means hereinabove described it will be apparent that ratchet pawl 108 is adapted to engage the several teeth, and when the same remains between a pair of said teeth on moving reciprocating lever 101 to the direction to which said pawl bears against the adjacent tooth 100, the shaft 25 will be rotated. On turning said reciprocating lever 101 to the opposite direction ratchet wheel 108 by virtue of its ride upon the inclined faces of teeth 100 will pass several teeth without affecting the rotation of the shaft. Spring 111, pin 113 and oblong slot 112 will permit the downward shifting movement of the shank 107 and ratchet pawl 108 for allowing said ratchet pawl 108 to pass the several teeth for repeating the initial shifting of reciprocating lever 101 for rotating shaft 25.

The bird cage for forming of which the present invention is adapted comprises in its ultimate formation uppermost annular band 114, central annular band 115 and lowermost annular band 116. Each of said annular bands before their subjection to the action of the present machine constitutes a strip 117, of which an enlarged fragmentary view is shown on Fig. 6, and which is preferably made of ductile material such as brass. Said metallic strip has spaced eyes 118 struck out substantially in the central portion of the strip and longitudinally thereof, which are adapted to receive metallic wires 119, which in their ultimate formation will contstitute wires 120 constituting the dome of the bird cage. Said strips 117 are adapted for insertion within grooves 63, 68 and 75 of the lowermost guiding bar illustrated on Figs. 10 to 12, both inclusive, the central bar 67 and the uppermost bar 73, respectively.

Upon insertion of said strips 117 within the respective grooves of said guiding bars hereinabove mentioned wires 119 are inserted through the eyes of each of the strips located in said grooves of said guiding bars, and it is observed that the body of said strips fit snugly within the respective grooves of said guiding bars and completely fill the same as may be clearly seen on Figs. 1 and 3, excepting eyes 118 which project beyond the faces of the guiding bars which are disposed toward the respective gears 48, 51 and 54. Said bars are comparatively long so that their free ends extend laterally of the machine, or are disposed at right-angle in respect of frame 20. This arrangement will also allow the employment of quite long portions of strips 117 for positioning within the respective grooves of said guiding bars. In other words this arrangement will facilitate arranging a framework of strips 117 and wires 119 before the same pass through the machine to be ultimately formed into the bird cage dome. When said strips 117 and wires 119 have been arranged into their cooperative relation and preparatory to causing the same to pass through the machine, reciprocating lever 101 is operated for imparting rotary movement to shaft 25 and gears 48, 51 and 54. It is observed that eyes 118 are arranged in a predetermined distance from each other so that when the gears 48, 51 and 54 rotate, the grooves 57 ingulf said eyes 118 for clamping wires 119 within said eyes. It is further observed that the distance between the two cooperating corners 58, on each side of groove 57, is smaller than the distance between the outer points of the base of eyes 118, so that when said corners 58 strike the inclined faces of eyes 118 the inclined walls of said eyes will be pressed toward each other as well as toward the strips 117, or in other words the pressure exerted by corners 58 as well as by the periphery of each gear adjacent groove 57 upon eyes 118 will tend to compress the same toward the encompassed portion of wires 119. Also the central point on the periphery adjacent groove 57 will press the apex of eye 118 for pressing said apex toward the body of the strip 117 and wire 119 for further clamping the wire in the eye.

The upper ends of wires 120 or rather 119, before the same pass between the guiding bars and their respective cooperating gears are looped toward the tubular member 86 and are forced in between plates 88 and 89 wherein the same are held temporarily during the operation of the machine and until the bird cage is completed. While said gears upon shaft 25 rotate and the three strips 117 which finally result in annular bands 114, 115 and 116 the latter being forced to pass past said gears by the frictional action of the gears in cooperation with the cooperating guiding bars, the incompleted cage also rotates and the upper ends of wires 120 turn about said tubular member 86 and between plates 88 and 89 or with said plates. By turning nut 93 down upon said tubular member 86, spring 92 will become compressed and will exert a greater pressure upon the upper plate 89 for increasing the frictional grip of plates 88 and 89 upon the upper ends of wires 120. Conversely by unscrewing the nut 93 friction of plates 88 and 89 upon the upper ends of wires 120 will be diminished and the same will then more freely move about the tubular member 86 during the process of completion of the bird cage.

A further purpose of the machine herein disclosed in addition to clamp the wires in the annular bands, is to form or shape strips 117 for imparting to the same round formation which the same have in the completed bird cage. This object is accomplished by pressure or gripping of said strips as they pass in between the gears upon shaft 25 and their cooperating guiding bars. For this purpose each of said guiding bars has tangential or curved portions 61, 69 and 76, respectively. The several gears are oppositely disposed to said curved portions of the guiding bars, and the peripheries of the gears pressing upon the adjacent faces of the guiding bars as well as the adjacent faces of strips 117 as the strips are fed through the points in question, impart curvatures to said strips 117 so that the same assume annular formation as is clearly seen on Fig. 2.

It is to be understood that strips 117 are adapted for shifting within grooves of the respective guiding bars 45, 46 and 47, as the formation of the cage progresses, and said shifting is accomplished by the respective gears 48, 51 and 54 by virtue of their hold upon eyes 118 due to the fact that said eyes remain within recesses 57 of each of said gears.

When the bird cage has been completed nut 96 and washer 95 are removed from the upper end of spindle 84, and nut 93 and spring 92 are removed from the tubular member 86, and thereupon the upper plate 89 is raised for freeing the upper ends of wires 120. When the last ends of annular bands 114, 115 and 116 have passed the points between the gears and their cooperating guiding bars so that both ends of each of said annular bands are free from the action of said gears and said guiding bars, the completed cage will be easily removed from the machine by pulling the same away from the gears in the direction of frame 20 on the plane with the plane of said frame 20. Thereupon the adjacent ends of annular bands 114, 115 and 116 are soldered or joined in any other suitable manner, and the upper ends of wires 120 are soldered to a suitable plate or otherwise rigidly affixed, and the bird cage will become completed.

It is observed that strips 117 may be a fraction thicker than the width of the grooves in the guiding bars, so that the pressure of the peripheries of the gears thereupon will be greater than upon the guiding bars, and this for the purpose of increasing the adaptability of said strips to assume annular formation as the same are fed in between the gears and the curved portions of said guiding bars.

The outer ends of each bar may be provided with hook 121, the outer end of which is oppositely disposed of the groove in the guiding bar, for the purpose of holding strips 117 in position in each guiding bar and for preventing bending or deflection of the farthest ends of said strips away from the guiding bars before the nearest ends of said strips are fed into the machine.

As already observed, the carriage 37 is adjustable upon block 31 by means of walls 35 and 36 and screws 40 for bringing said carriage to or away from gears 48, 51 and 54, for the purpose of increasing or decreasing the pressure of the peripheries of said gears upon their cooperating guiding bars and consequently for increasing or decreasing the pressure which the peripheries of said gears exert upon the adjacent faces of strips 117 as the same pass said gears substantially at curved portions 76, 69 and 61, of the several guiding bars, respectively. Finer adjustment of said guiding bars in respect of their cooperating gears will be had through the medium of screws 66, 72 and 79 as hereinabove described.

Wires 120 at a point below the uppermost annular band 114 begin to loop upwardly and toward the center of the bird cage and this makes necessary for said annular band 114 to remain in parallel relation with the plane of said wires at that point, or in other words it is necessary for said annular band 114 to remain at an angle in respect of the other two bands 115 and 116. This angular position of said annular band 114 on vertical plane through the bird cage is imparted to said band through the medium of tapered periphery of gear 48 and the inclined adjacent face of guiding bar 73. It has been found in practice that due to the angular position of strips 117 as the same are fed in between gear 48 and guiding bar 73 and the consequent pressure of said gear upon said strip, the annular band 114 has a tendency to bend downwardly and to distort the shape of the bird cage instead of bending on a horizontal plane. To obviate the tendency of said annular band 114 to bend downwardly and consequently to distort the shape of the completed bird cage a modified form of the uppermost guiding bar illustrated on Figs. 13 and 14 is provided. Said modified guiding bar includes body portion 122 which in the main is of like construction as the body portion of the uppermost guiding bar 73 shown on Figs. 1 and 2. At its inner end said guiding bar is enlarged both on a vertical line and on a horizontal line and forms head 123. Groove 124 is made longitudinally of said guiding bar 122 for receiving therewithin the uppermost strip 117 which ultimately is formed in the uppermost annular band 114. Said groove 124 at head 123 spreads out upwardly with respect to the operative position of said guiding bar in the carriage 37. The upper portion of the guiding bar 122 at a point where curve 125 begins is cut away and abruptly terminates as at 126.

The body of said guiding bar 122 at points between end 126 of the upper portion of the guiding bar and point 127 where the head proper 123 begins, is grooved or chiseled out presenting a concaved depression wherein the inner portion of block 128 correspondingly shaped is received. Said block on horizontal plane presents the shape of said head 125 and of portion of the remaining part of the guiding bar with this exception that the same is narrower than said head or the remaining portion of the guiding bar as seen on Fig. 13, and the aforementioned depression does not extend throughout the width of the guiding bar. Portion of said block 128 fitting within said depression is convex or upwardly curved as at 129 and the forwardly projecting edge of said portion of said block 128 is a continuation of the upper portion of the guiding bar constituting the upper wall of groove 124. Said block is maintained in position and in operative engagement with the guiding bar by means of screws 130.

Said modified uppermost guiding bar hereinabove described further includes lug 131 at the lower side of said guiding bar and oppositely disposed from the inner termination of the convex enlargement 129 of block 128. The outer edge of said lug 131 remains flush or presents a continuing surface of the lower edge of the guiding bar which constitutes the lower wall of groove 124. Two opposing walls 132 of lug 131, which are transversely disposed in respect of the guiding bar, are inwardly tapered or at an incline preventing the shifting movement of said lug outwardly of said guiding bar on horizontal plane when said bar is in operative position within the machine. As is apparent said lug is positioned in a recess or cavity of a formation corresponding to the formation of said lug. While said lug is prevented from transverse shifting on horizontal plane in respect of said guiding bar when the same remains in operative position within the machine, it is adapted for transverse shifting on vertical plane when the guiding bar is in an operative position, by virtue of which arrangement said lug can be brought toward or away from the convex surface 129 of block 128. The face 133 of said lug 131 which is disposed toward the convex portion 129 of block 128 is tapered so that it is substantially in parallel relation with a portion of said convex portion 129 of block 128, as clearly seen on Fig. 14. From the arrangement hereinabove described it will be seen that face 133 of lug 131 can be brought toward or away from the convex face 129 of block 128. The outer face of lug 131 as well as the outer face of block 128 are curved and form the continuation of curve 125 of the guiding bar. From the construction described it will be apparent that the opposing face 129 of block 128 and face 133 of lug 131 constitute a substantial continuation of two parallel faces of groove 124.

As hereinabove stated said lug 131 may be brought toward or away from the convex portion of block 128 and means is provided for regulating the distance of said lug 131 from said convex portion of block 128. Said means includes bolt 134 which is integrally formed with lug 131 and substantially is transversely disposed with respect to the inclined face 133 of said lug 131. In the operative association of said lug with the guiding bar said bolt passes transversely of the guiding bar on vertical line when the guiding bar is in operative position in the machine. Registering bores 135 made in the guiding bar and in the block 128 accommodate said bolt 134. The outer end of said bolt 134 is threaded as at 136 for receiving nut 137. When said nut 137 is tightened upon said bolt 134, said bolt will be forced to shift upwardly of the guiding bar when the same remains in operative association with the machine, and due to said shifting movement of said bolt lug 131 will likewise be brought upwardly and toward the convex face of block 128. On releasing or loosening nut 137 bolt 134 will shift in the opposite direction or rather will fall downwardly in relation to the operative position of the guiding bar by virtue of its gravity, since bores 135 are of a diameter which is larger than the diameter of said bolt 134, and their surfaces are smooth and not threaded so that the bolt does not engage the peripheries of said bores 135. By this action lug 131 will likewise shift downwardly or away from block 128. Even though lug 131 may frictionally engage the adjacent walls of the recess or cavity in the guiding bar wherein the same is positioned the action of the uppermost annular band 114 upon said lug, which will be hereinafter explained, will force said lug to drop down or shift away from block 128 on loosening or releasing nut 137.

The shape of groove or recess 45 should be slightly modified to accommodate the altered shape of said modified guiding bar hereinabove described and illustrated on Figs. 13 and 14, and the lower horizontal wall of said groove 45 should have a comparatively deep depression accommodating said lug 131 so that said lower face of said groove 45 may not interfere with the operation of said lug 131. Or said recess 45 may be narrower with the head of carriage 37 likewise narrower for receiving the inner edge 138 of the guiding bar 122. Said modified form of the guiding bar adjacent its rear or inner edge 138 is provided with a pair of threaded bores 139 for receiving the ends of screws 79 whereby the guiding bar may be adjusted either toward or away from the cooperating gear 48.

Employing said modified form of the guiding bar illustrated on Figs. 13 and 14 for shaping and guiding the uppermost annular band 114 the above mentioned distortion or tendency of said annular band 114 to form or bend downwardly when the same is formed or shaped with the aid of the uppermost guiding bar illustrated on Figs. 1 and 2, will be eliminated. The lower edge of said uppermost annular band 114 immediately after the same has passed the periphery of gear 48 will meet with the resistance of the inclined face 133 of lug 131 so that against the tendency of said annular band to form or bend downwardly said inclined face will bear against the lower edge of said annular band 114 immediately after it had undergone the process of its formation and will be deflected or forced to travel an upward path so that when a substantial portion of said annular band 114 has been formed the body of the band will substantially be positioned on a horizontal plane and distortion of said band and the bird cage will be eliminated. In other words the tendency of said uppermost annular band 114 to form or to curl downwardly will be counteracted by the inclined face 133 of lug 131 by moving the same upwardly, so that the formation of said annular band 114 on horizontal plane of the bird cage and parallel of the remaining two annular bands will be accomplished. The upper edge of said annular band 114 will be guided in its upward path by the convex face 129 of block 128 as the body of said annular band 114 is guided upwardly by the action of lug 131.

Various metals which may be employed in said annular band 114 will have various degrees in their tendency to curl or bend downwardly when said annular band has passed beyond gear 48, and hence the necessity for regulating the angle or degree to which it is desired to force said annular band in its upward path. If the annular band ordinarily would tend to curl downwardly to a greater degree after the same has passed the action of gear 48, then to counteract said tendency a greater angle for the upward movement of the annular band might be desirable, and to attain this purpose nut 137 is screwed down upon bolt 134 and the inclined face 133 of lug 131 is brought toward the convex face 129 of the block 128, and thus a greater angle for upward travel of said annular band 114 will be had. Conversely, if only slight action upon said annular band by lug 131 is desired, then nut 137 is loosened and the natural tendency of annular band to form downwardly will force said lug 131 downwardly and the action of said lug 131 for guiding or forcing the annular band upwardly will be diminished.

For the purpose of better understanding the construction and operation of said modified form of guiding bar illustrated on Figs. 13 and 14, the operative edge, or the edge having groove 124 is illustrated as being straight edge similar to the operative edges of the other two guiding bars. However, in practice said operative edge of the modified form of the guiding bar should likewise be at an incline or in parallelism with the periphery of the cooperating gear 48, similarly as the operating edge of guiding bar 73 illustrated on Figs. 1 and 2.

The operating mechanism illustrated on Fig. 1 and including ratchet wheel 97, reciprocating lever 101 and ratchet pawl 108 are adapted to rotate shaft 25 and gears 48, 51 and 54 in one direction only. This means is incapable of reversing the rotation of said shaft and said gears in case it is desirable for any reason to withdraw either portion or even the entire bird cage from the machine. The occasion for withdrawing the formed portion of the bird cage may arise when eyes 118 of strip 117 were not properly clamped in the notches or grooves 57 of the three gears, and this due to the reason that the three guiding bars may not have been properly adjusted toward the gears in order that the same may exert a pressure of sufficient degree upon said eyes 118 and upon the remaining body portion of strip 117 for clamping eyes 118 to wires 119 and for bending or curving the annular bands 114, 115 and 116 as the same slide past the peripheries of the respective gears.

Therefore, a suitable mechanism as illustrated on Figs. 3, 15, 16 and 17 is devised which not only is capable of imparting a rotary movement to shaft 25 and gears 48, 51 and 54 to the direction to which strips 117 ultimately forming into annular bands 114, 115 and 116 are fed, but also to provide means for reversing the direction of rotation of said shaft and said gears for the purposes hereinabove specified.

For adapting the present machine to be driven or operated by said mechanism hereinabove mentioned all the parts of the machine hereinabove fully described remain unchanged, with this exception, however, that the machine is provided with a pair of bearings 140 and 141. Bearing 140 is integrally formed with and downwardly projects from the frame 20 and its flange 21. Bearing 141 is integrally formed with and downwardly projects from vertical plate 26. Each of said bearings is transversely disposed with respect to said frame 20 and said plate 26, respectively. Each of said bearings 140 and 141 is provided with downwardly projecting lug 142, integrally formed with each of said bearings, and provided with apertures 143 for the purposes hereinafter stated. Said bearings 140 and 141 are further provided with transverse bores 144 and 145 for receiving therewithin collars 146 and 147 of bevel gears 148 and 149, respectively. Said collars 146 and 147 are adapted for free rotary movement within said bores 144 and 145. Horizontal shaft 150 passes through said collars 146 and 147 and gears 148 and 149 and is adapted for free rotary movement within said collars and said gears. For preventing the displacement of said collars and said gears from their respective bearings 140 and 141 and also for guarding against the longitudinal shifting movement of said collars and gears with respect to shaft 150 washers 151 and 152 are set upon and rigidly affixed to the outer ends of collars 146 and 147, respectively, which project beyond the outer faces of said gears. Disposed above and meshing with said gears 148 and 149 is bevel gear 153 which is keyed to the lower end of shaft 25, through the medium of collar 154 integrally formed with said gear 153 and upwardly projecting therefrom, and pin 155 which passes through said collar 154 and shaft 25.

The inner ends of gears 148 and 149 are provided with clutch claws 156 and 157, respectively, adapted to engage clutch claws 158 and 159, respectively, said latter clutch claws being provided upon the outer ends of clutch collar 160 which is set upon shaft 150 and between gears 148 and 149, and which is adapted for free longitudinal movement upon said shaft 150. Said clutch collar 160 at its center is provided with an annular groove 161 for receiving therewithin lugs 162 integrally formed with and inwardly projecting from bifurcated ends or forks 163 at the upper end of the operating lever 164, as clearly seen on Fig. 17.

Shaft 150 has a longitudinal groove 165, and said clutch collar 160 has a similar groove registering with said groove 165 upon shaft 150. The two grooves are adapted to receive a lug or wedge 166 whereby the rotary movement of said clutch collar 160 independently of shaft 150 is prevented, but which does not prevent the longitudinal shifting movement of said clutch collar 160 with respect to shaft 150.

The distance between the clutch claws 156 and 157 upon gears 148 and 149 is either equal to or slightly larger than the length of said clutch collar 160, so that when said clutch collar 160 fills the distance or space between the aforementioned clutch claws of said gears, said clutch collar will remain out of mesh or out of engagement with said clutch claws upon said gears 148 and 149, or in other words will remain in neutral position. In this latter case on rotation of shaft 150 gears 148 and 149 will not be in any way affected by the rotation of said shaft, since the shaft freely passes through said gears and is not keyed thereto, although the clutch collar 160 will make a rotary movement with the shaft since said clutch collar is keyed to the shaft on transverse plane thereof and by means of lug 166.

Said operating lever 164 adjacent its upper end is pivoted to post 167 by screw or pin 168. Said post 167 is mounted upon floor 169. Above said pivot point 168 the operating lever 164 has two springs 170 and 171, of equal length and tension, attached thereto by their inner ends. By their outer ends said springs are attached within apertures 143 of lugs 142 which downwardly project from bearings 140 and 141 as hereinabove described. The lower end of said lever 164 carries a cross member 172 which has at each of its ends foot rests 173 and 174, respectively.

The object of said coil springs 170 and 171 is to maintain lever 164 in vertical position, for maintaining the clutch collar 160 in neutral position or out of engagement with the clutch ends of gears 148 and 149.

When the operator steps upon one of the foot rests 173 and 174 the lower end of lever 164 will be tilted either to the right or to the left which action will tilt the upper end of lever 164 and fork 163 in the opposite direction, that is either to the left or to the right, respectively. This action of said lever 164 and its bifurcated end 163 will force the clutch collar 160 into engagement with gear 148 or gear 149 due to the pressure of lugs 162 upon the left or right wall of groove 161 as is obvious. When said clutch collar 160 is in engagement with gear 148, for instance, said gear will be rotated in the direction of rotation of shaft 150, and said gear, meshing with horizontal bevel gear 153 will bring about the rotation of said gear 153 and shaft 25 which will cause the rotation of gears 48, 51 and 54 in the usual manner. By stepping upon foot rest 174 the tilting of shaft 164 will be reversed, and consequently the clutch collar 160 will become disengaged from the clutch claws of gear 148 and will be brought into engagement with clutch end 157 of gear 149. This will reverse the rotation of shaft 25 and gears 48, 51 and 54, and thus the capability of rotation of shaft 25 with gears 48, 51 and 54, for the purposes hereinabove stated will be attained.

It is understood that shaft 150 may be attached to any known means such as electric motor or the like for imparting a rotary motion thereto.

As hereinabove indicated a plurality of bird cage making machines may be set above shaft 150 for simultaneous operation by several operators, and the mode of arrangement of several bird cage making machines upon one operating shaft 150 is illustrated on Fig. 3 where one of the bird cage making machines has been shown in full together with the operating mechanism for rotation of shaft 25, and one operating mechanism upon shaft 150 has been shown partly.

It should be added that springs 170 and 171 normally are under contracted tension, and since each of said springs is of like length and construction each of them will exert an equal pulling force upon lever 164 and will counterbalance each other for maintaining said lever 164 in neutral or vertical position. On releasing the foot pressure upon cross member 172 springs 170 and 171 will bring lever 164 and consequently clutch collar 160 into a neutral or inoperative position with respect to gears 148 and 149.

While there is described herein a preferred embodiment of the present invention, it is nevertheless to be understood that minor changes may be made therein without departing from the spirit and scope of the invention as claimed.

What I claim as new is:

1. A machine for making wire bird cages of the type wherein the wires are clamped within annular bands, comprising guiding members, and rotary elements cooperating with said guiding members for forming said annular bands and for clamping said wires thereto.

2. A machine for making bird cages of the type wherein wires are held by annular bands, comprising guiding members, rotary elements cooperating with said guiding members for forming said annular bands and for clamping said wires thereto, and means for imparting rotary movement to said rotary elements.

3. A machine for making bird cages of the type wherein wires are clamped within annular bands, comprising guiding members, rotary elements cooperating with said guiding members for forming said annular bands and for clamping said wires thereto, means for imparting a rotary movement to said rotary elements, and adjusting means for said guiding members for bringing the same to or away from said rotary elements.

4. A machine for making bird cages of the type which include wire domes wherein the wires are clamped and held in position by annular bands, comprising a frame, rotary elements positioned in said frame, guiding members cooperating with said rotary elements, means for imparting rotary movement to said rotary elements, and adjusting means for said guiding members for bringing the same to or away from said rotary elements, said rotary elements being adapted to exert pressure upon said annular bands as the same pass between said rotary elements and said guiding members for shaping said annular bands and for clamping the wires of the dome thereto.

5. A machine for making bird cages of the type which include a wire dome and a plurality of annular bands wherein the dome wires are clamped, comprising a frame, a plurailty of gears in said frame, and a plurality of guiding members each cooperating with the respective gear, said gears being adapted to exert pressure upon the annular bands as the same are fed past said gears and said guiding members for shaping said annular bands and for clamping said dome wires thereto.

6. A machine for making bird cages of the type which include a wire dome and a plurality of annular bands wherein the dome wires are clamped, comprising a frame, a plurality of gears in said frame, a plurality of guiding members each cooperating with the respective gear, said gears being adapted to exert pressure upon the annular bands as the same are fed past said gears and said guiding members for shaping said annular bands and for clamping said dome wires thereto, and means for imparting rotary movement to said gears.

7. A machine for making bird cages of the type which include a wire dome and a plurality of annular bands wherein the dome wires are clamped, comprising a frame, a plurality of gears in said frame, a plurality of guiding members each cooperating with the respective gear, said gears being adapted to exert pressure upon the annular bands as the same are fed past said gears and said guiding members for shaping said annular bands and for clamping said dome wires thereto, means for imparting rotary movement to said gears, and adjusting means for said guiding members for bringing the same to or away from said gears for the purpose of increasing or decreasing pressure of said gears upon said annular bands.

8. A machine for making bird cages of the type wherein dome wires are clamped in annular bands, said annular bands consisting of strips which have spaced eyes wherein said wires are inserted preparatory to the action of the machine, comprising a plurality of guiding members wherein said strips are receivable, and rotary elements cooperating with said guiding members for shaping said strips into the annular bands of the cage and for compressing said eyes for the purpose of clamping said wires therein.

9. A machine for making bird cages of the type wherein dome wires are clamped in annular bands, said annular bands consisting of strips which have spaced eyes wherein said wires are inserted preparatory to the action of the machine, comprising a plurality of guiding members wherein said strips are receivable, gears cooperating with said guiding members for shaping said strips into the annular bands of the cage and for compressing said eyes for the purpose of clamping said wires therein, and means for imparting rotary motion to said gears.

10. A machine for making bird cages of the type wherein dome wires are clamped in annular bands, said annular bands consisting of strips which have spaced eyes wherein said wires are inserted preparatory to the action of the machine, comprising a plurality of guiding members wherein said strips are receivable, gears cooperating with said guiding members for shaping said strips into the annular bands of the cage and for compressing said eyes for the purpose of clamping said wires therein, means for imparting rotary motion to said gears, and adjusting means for said guiding members for bringing the same to or away from said gears for the purpose of increasing or decreasing pressure of said gears upon said annular bands.

11. A machine for making bird cages of the type wherein dome wires are clamped in annular bands, said annular bands consisting of strips which have spaced eyes wherein said wires are inserted preparatory to the action of the machine, comprising a plurality of guiding members wherein said strips are receivable, rotary elements cooperating with said guiding members for shaping said strips into annular bands of the cage and for compressing said eyes for the purpose of clamping said wires therein, and means for supporting the upper ends of the wires as the bird cage undergoes the process of formation.

12. A machine for making bird cages of the type wherein dome wires are clamped in annular bands, said annular bands consisting of strips which have predeterminately spaced eyes wherein said wires are inserted preparatory to the action of the machine, comprising a plurality of guiding members wherein said strips are receivable, and rotary elements cooperating with said guiding members for shaping said strips into the annular bands of the cage, said rotary elements being provided with notches for receiving said eyes for the purpose of compressing said eyes and clamping said wires therein.

13. A machine for making bird cages of the type wherein dome wires are clamped in annular bands, said annular bands consisting of strips which have predeterminately spaced eyes wherein said wires are inserted preparatory to the action of the machine, comprising a plurality of guiding members wherein said strips are receivable, gears cooperating with said guiding members for shaping said strips into the annular bands of the cage, and means for imparting rotary movement to said gears, said gears being provided with notches for receiving and compressing said eyes for the purpose of clamping said wires therein.

14. A machine for making bird cages of the type wherein dome wires are clamped in annular bands, said annular bands consisting of strips which have predeterminately spaced eyes wherein said wires are inserted preparatory to the action of the machine, comprising a frame, a plurality of guiding members, a plurality of gears upon said frame, each cooperating with its respective guiding member, means for supporting the upper ends of said wires as the bird cage undergoes the process of formation, adjusting means for said guiding members for bringing the same to or away from said gears for the purpose of increasing or decreasing the pressure of said gears upon said strips as the same are fed past said gears and said guiding bars, and means for imparting rotary movement to said gears, said gears being provided with notches for receiving said eyes, said notches substantially corresponding in shape to the shape of said eyes but being of smaller dimensions than the latter for compressing said eyes for the purpose of clamping said wires therein.

15. A machine for making bird cages of the type wherein dome wires are clamped in annular bands, said annular bands consisting of strips which have predeterminately spaced eyes wherein said wires are inserted preparatory to the action of the machine, comprising a frame, a block integrally formed with said frame, a carriage upon said block, a plurality of guiding members upon said carriage, rotary elements each cooperating with its respective guiding members for shaping said strips into the annular bands of the cage as said strips are fed past said rotary elements, adjusting means cooperating with said block and said carriage for the purpose of bringing said carriage to or away from said rotary elements, and adjusting means upon said carriage for bringing about a finer adjustment of said guiding members with respect to their cooperating rotary elements for either decreasing or increasing the pressure of said rotary elements upon said strips as the same are fed past said rotary elements, said rotary elements being provided with means for compressing said eyes for the purpose of clamping said wires therein.

16. A machine for making bird cages of the type wherein dome wires are clamped in annular bands, said annular bands consisting of strips which have predeterminately spaced eyes wherein said wires are inserted preparatory to the action of the machine, comprising a frame, a block integrally formed with said frame, a carriage upon said block, a plurality of guiding members upon said carriage, gears upon said frame cooperating with said guiding members for forming said strips into annular bands of the cage as said strips are fed past said gears, adjusting means cooperating with said block and said carriage for the purpose of bringing said carriage to or away from said gears, said gears having notches for compressing said eyes for the purpose of clamping said wires therein, adjusting means upon said carriage for bringing about a finer adjustment of said guiding members with respect to their cooperating gears for either decreasing or increasing the pressure of said gears upon said strips as the same are fed past said gears, and means for imparting rotary movement to said gears.

17. A machine for making bird cages of the type wherein dome wires are clamped in annular bands, said annular bands consisting of strips which have predeterminately spaced eyes wherein said wires are inserted preparatory to the action of the machine, comprising a frame, a plurality of guiding members upon said frame, a shaft in said frame, a plurality of gears upon said shaft, each of said gears cooperating with its respective guiding member, said gears being adapted to shape said strips into annular bands as the same are fed past said gears and said guiding members, and means for imparting rotary motion to said gears, said means including a ratchet wheel fixed to said gear and a reciprocating lever actuating said ratchet wheel.

18. A machine for making bird cages of the type wherein dome wires are clamped in annular bands, said annular bands consisting of strips which have predeterminately spaced eyes wherein said wires are inserted preparatory to the action of the machine, comprising a frame, a plurality of guiding members upon said frame, a shaft in said frame, a plurality of gears upon said shaft, each of said gears cooperating with its respective guiding member, said gears being adapted to shape said strips into annular bands as the same are fed past said gears and said guiding members, a ratchet wheel fixed to said shaft, a reciprocating lever, and a ratchet pawl engaging said ratchet wheel for the purpose of imparting rotary movement to said ratchet wheel and said shaft on reciprocating said lever.

19. A machine for making bird cages of the type wherein dome wires are clamped in annular bands, said annular bands consisting of strips which have predeterminately spaced eyes wherein said wires are inserted preparatory to the action of the machine, comprising a plurality of guiding members wherein said strips are receivable, rotary elements cooperating with said guiding members, portions of said guiding members oppositely of said rotary elements being curved for imparting curvatures to said strips as the same are fed past said portions and said rotary elements, and means for imparting rotary movement to said rotary elements.

20. A machine for making bird cages of the type wherein dome wires are clamped in annular bands, said annular bands consisting of strips which have predeterminately spaced eyes wherein said wires are inserted preparatory to the action of the machine, comprising a plurality of guiding members wherein said strips are receivable, rotary elements cooperating with said guiding members, portions of said guiding members adjacent said rotary elements corresponding to the outline of adjacent faces of said rotary elements for the purpose of shaping said strips as the same are fed past said rotary elements, means in said rotary elements for compressing said eyes for the purpose of clamping said wires therein, and means for imparting rotary movement to said rotary elements.

21. A machine for making bird cages of the type wherein dome wires are clamped in annular bands, said annular bands consisting of strips which have predeterminately spaced eyes wherein said wires are inserted preparatory to the action of the machine, comprising a plurality of guiding members wherein said strips are receivable, rotary elements cooperating with said guiding members, portions of said guiding members adjacent said rotary elements corresponding to the outline of adjacent faces of said rotary elements for the purpose of shaping said strips as the same are fed past said rotary elements, means in said rotary elements for compressing said eyes for the purpose of clamping said wires therein, means for imparting rotary movement to said rotary elements, and adjusting means for said guiding members for bringing the same to or away from said rotary elements for the purpose of increasing or decreasing the pressure of said rotary elements upon said strips as the same are fed past said rotary elements.

22. A machine for making bird cages of the type wherein dome wires are clamped in annular bands, said annular bands consisting of strips which have spaced eyes wherein said wires are inserted preparatory to the action of the machine, comprising a plurality of guiding members, said guiding members being provided with grooves for receiving said strips, rotary elements cooperating with said guiding members, and means upon said rotary elements for shaping said strips into annular bands as said strips are fed past said rotary elements and for compressing said eyes for clamping said wires therein.

23. A machine for making bird cages of the type wherein dome wires are clamped in annular bands, said annular bands consisting of strips which have spaced eyes wherein said wires are inserted preparatory to the action of the machine, comprising a plurality of guiding members having grooves wherein said strips are receivable, said grooves being of an equal or a lesser width than the thickness of said strips, said eyes projecting beyond said grooves, and rotary elements cooperating with said guiding members for imparting curvatures to said strips as the same are fed past said rotary elements and for compressing said eyes for clamping said wires therein.

24. A machine for making bird cages of the type wherein dome wires are clamped in annular bands, said annular bands consisting of strips which have spaced eyes wherein said wires are inserted preparatory to the action of the machine, comprising a plurality of guiding members having grooves wherein said strips are receivable said grooves being of an equal or a lesser width than the thickness of said strips, said eyes projecting beyond said grooves, rotary elements cooperating with said guiding members for imparting curvatures to said strips as the same are fed past said rotary elements and for compressing said eyes for clamping said wires therein, and adjusting means for bringing said guiding members to or away from said rotary elements for increasing or decreasing the pressure of said rotary elements upon said strips and said eyes as the same are fed past said rotary elements.

25. A machine for making bird cages of the type wherein dome wires are clamped in annular bands, said annular bands consisting of strips which have spaced eyes wherein said wires are inserted preparatory to the action of the machine, comprising a plurality of guiding members wherein said strips are receivable, rotary elements cooperating with said guiding members for shaping said strips into annular bands as the same are fed past said rotary elements and for compressing said eyes for clamping said wires therein, and means upon one of said guiding members for actuating one of said annular bands upwardly for maintaining uniform formation of the cage on horizontal plane.

26. A machine for making bird cages of the type wherein dome wires are clamped in annular bands, said annular bands consisting of strips which have spaced eyes wherein said wires are inserted preparatory to the action of the machine, comprising a plurality of guiding members wherein said strips are receivable, rotary elements cooperating with said guiding members for shaping said strips into annular bands as the same are fed past said rotary elements and for compressing said eyes for clamping said wires therein, and means upon one of said guiding members for actuating one of said annular bands upwardly for maintaining uniform formation of the cage on horizontal plane, said means including a block positioned in one of said guiding members urging one of said annular bands in an upward course as the same passes past one of said rotary elements.

27. A machine for making bird cages of the type wherein dome wires are clamped in annular bands, said annular bands consisting of strips which have spaced eyes wherein said wires are inserted preparatory to the action of the machine, one of said annular bands being at an incline with respect to the remaining bands, comprising a plurality of guiding members wherein said strips are receivable, rotary elements cooperating with said guiding members for shaping said strips into annular bands as the same are fed past said rotary elements and for compressing said eyes for clamping said wires therein, and means for counteracting the tendency of said inclined band to form downwardly and to distort the shape of the bird cage.

28. A machine for making bird cages of the type wherein dome wires are clamped in annular bands, said annular bands consisting of strips which have spaced eyes wherein said wires are inserted preparatory to the action of the machine, comprising a plurality of guiding members wherein said strips are receivable, rotary elements cooperating with said guiding members for shaping said strips into annular bands as the same are fed past said rotary elements and for compressing said eyes for clamping said wires therein, means for rotating said rotary elements, and means for reversing the direction of rotation of said rotary elements.

29. A machine for making bird cages of the type wherein dome wires are clamped in annular bands, said annular bands consisting of strips which have spaced eyes wherein said wires are inserted preparatory to the action of the machine, comprising a frame, a shaft in said frame, a plurality of guiding members wherein said strips are receivable, rotary elements upon said shaft cooperating with said guiding members for shaping said strips into annular bands as the same are fed past said rotary elements and for compressing said eyes for clamping said wires therein, a gear upon said shaft, means cooperating with said gear for rotating said shaft, and means cooperating with said gear for reversing the rotation thereof.

30. A machine for making bird cages of the type wherein dome wires are clamped in annular bands, said annular bands consisting of strips which have spaced eyes wherein said wires are inserted preparatory to the action of the machine, comprising a frame, a shaft in said frame, a plurality of guiding members wherein said strips are receivable, rotary elements upon said shaft cooperating with said guiding members for shaping said strips into annular bands as the same are fed past said rotary elements and for compressing said eyes for clamping said wires therein, a gear upon said shaft, a pair of bearings integrally formed with said frame, a pair of collars positioned within said bearings, bevel gears integrally formed with said collars, said bevel gears being adapted to normally remain out of mesh with the gear upon said shaft, a horizontal shaft passing through said collars and said bevel gears, a clutch block upon said horizontal shaft positioned between said bevel gears, said clutch block being adapted for rotation with said horizontal shaft, means for shifting said clutch block into engagement with either of said bevel gears, and means for imparting rotation to said horizontal shaft.

31. A machine for making bird cages of the type wherein dome wires are clamped in annular bands, said annular bands consisting of strips which have spaced eyes wherein said wires are inserted preparatory to the action of the machine, comprising a frame, a shaft in said frame, a plurality of guiding members wherein said strips are receivable, rotary elements upon said shaft cooperating with said guiding members for shaping said strips into annular bands as the same are fed past said rotary elements and for compressing said eyes for clamping said wires therein, a gear upon said shaft, a pair of bearings integrally formed with said frame, a pair of collars positioned within said bearings, said collars being adapted for free rotary movement within said bearings, bevel gears integrally formed with said collars, said bevel gears facing said gear and being adapted to normally remain out of mesh therewith, a horizontal shaft passing through said collars and said bevel gears, said horizontal shaft being adapted for free rotary movement within said collars and said gears, a clutch upon said horizontal shaft positioned intermediately of said bevel gears, said bevel gears adjacent said clutch being provided with clutch claws for engagement with said clutch, means upon said clutch and said horizontal shaft for keying said clutch transversely of said horizontal shaft, said means permitting free sliding movement of said clutch longitudinally of said horizontal shaft, means for longitudinally shifting said clutch upon said horizontal shaft for engaging said clutch with the clutch claws upon one or the other of said bevel gears for imparting rotation of one or the other of said bevel gears with said horizontal shaft, and means for rotating said horizontal shaft.

32. A machine for making bird cages of the type wherein dome wires are clamped in annular bands, said annular bands consisting of strips which have spaced eyes wherein said wires are inserted preparatory to the action of the machine, comprising a frame, a shaft in said frame, a plurality of guiding members wherein said strips are receivable, rotary elements upon said shaft cooperating with said guiding members for shaping said strips into annular bands as the same are fed past said rotary elements and for compressing said eyes for clamping said wires therein, a gear upon said shaft, a pair of bearings integrally formed with said frame, a pair of collars positioned within said bearings, said collars being adapted for free rotary movement within said bearings, bevel gears integrally formed with said collars, said bevel gears facing said gear and being adapted to normally remain out of mesh therewith, a horizontal shaft passing through said collars and said bevel gears, said horizontal shaft being adapted for free rotary movement within said collars and said gears, a clutch upon said horizontal shaft positioned intermediately of said bevel gears, said bevel gears adjacent said clutch being provided with clutch claws for engagement with said clutch, means upon said clutch and said horizontal shaft for keying said clutch transversely of said horizontal shaft, said means permitting free sliding movement of said clutch longitudinally of said horizontal shaft, a pivoted lever disposed below said clutch, a fork at the upper end of said lever in engagement with said clutch, said lever normally remaining in a vertical position for maintaining said clutch out of engagement with the clutch claws upon both of said bevel gears, means for shifting said lever in either direction for engaging said clutch with the clutch claws upon one or the other of said bevel gears for imparting the rotation of one or the other bevel gears with said horizontal shaft for rotating said rotary elements into one or the other direction, and means for rotating said horizontal shaft.

33. A machine for making bird cages of the type wherein dome wires are held in position by substantially horizontal members, comprising guiding members, and rotary elements cooperating with said guiding members for forming said horizontal members and for clamping said wires thereto.

34. A machine for making bird cages of the type wherein dome wires are clamped in annular bands, one of said annular bands being at the spherical portion of the dome, comprising means for shaping said annular bands, and means for imparting to said one annular band at the spherical portion of the dome the juxta-position whereby said latter annular band may correspond to the contour of said spherical portion of the dome.

35. A machine for making bird cages of the type wherein dome wires are clamped within annular bands, comprising guiding members, rotary elements cooperating with said guiding members for forming said annular bands and for clamping said wires thereto, and means for feeding said annular bands past said guiding members and said rotary elements.

36. A machine for making bird cages of the type wherein dome wires are clamped in annular bands, said annular bands consisting of strips which have spaced eyes wherein said wires are inserted preparatory to the action of the machine, comprising guiding members, rotary members for shaping said strips into the annular bands of the cage and for compressing said eyes for the purpose of clamping said wires therein, and means for feeding said strips past said guiding members and said rotary elements.

In testimony whereof I affix my signature.

ANTON M. KROCZEK.